UNITED STATES PATENT OFFICE 2,552,536

O,O-DI-(METHOXYPHENYL) AMIDOTHIO-PHOSPHATE

Lewis R. Drake, Midland, Mich., assignor to The Dow Chemical Company, Midland, Mich., a corporation of Delaware No Drawing. Application August 23, 1948, Serial No. 45,789

3 Claims. (Cl. 260—461)

This invention is directed to O,O-di-(methoxyphenyl) amidothiophosphates having the formula

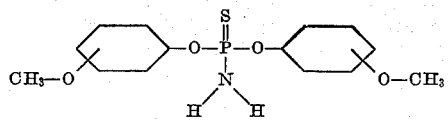

These compounds are white crystalline solids somewhat soluble in many organic solvents, substantially insoluble in water, stable to light and air, and non-corrosive to the skin of humans. They are useful as toxic constituents of insecticidal mixtures and as intermediates for the preparation of more complex organic derivatives.

The new amidothiophosphates may be synthesized by reacting a methoxy-phenol with thiophosphoryl chloride (PSCl₃), and the resulting intermediate with ammonia. This preparation is conveniently carried out in pyridine, employing approximately 2 molecular proportions of the phenol for each molecular proportion of thiophosphoryl chloride. In the initial reaction, the phenol is dissolved in an excess of pyridine and added portionwise with agitation to thiophosphoryl chloride. The reaction is exothermic, and may conveniently be carried out at the boiling temperature of the pyridine, and under reflux. The mixture is then cooled to about room temperature and added slowly to a molecular excess of liquid ammonia. Unreacted ammonia and pyridine are then evaporated out of the crude reaction product, and the residue extracted with a selective solvent such as acetone, benzene, or methyl alcohol. Upon evaporation of the extract, the desired amidothiophosphate is recovered as a residue. This product may be recrystallized or otherwise purified as expedient.

The following examples illustrate the invention:

*Example 1.—O,O-di-(4-methoxyphenyl) amidothiophosphate*

24.8 grams (0.2 mole) of 4-methoxyphenol and 50 milliliters of pyridine were mixed together and the resulting solution added portionwise with agitation over a period of 15 minutes to 17 grams (0.1 mole) of thiophosphoryl chloride. The temperature gradually rose to the boiling temperature of the mixture during the addition. The mixture was then cooled over a period of 1 hour to approximately room temperature at which point the crude intermediate product was semi-solid. The product was liquefied by warming and stirring, and added portionwise with careful agitation over a period of 15 minutes to 50 milliliters of liquid ammonia. An air stream was blown across the surface of the reaction mixture for 16 hours to evaporate off pyridine and excess ammonia. The semi-solid residue was then filtered to remove the last of the pyridine and to recover 30 grams of a solid crude reaction product. The latter was extracted with 200 milliliters of cold methyl alcohol and the resulting extract evaporated to one quarter of its original volume. A white crystalline O,O-di-(4-methoxyphenyl) amidothiophosphate product separated from solution, was recovered by filtration, and air dried. This product had a melting point of 136°–138° C. and the formula

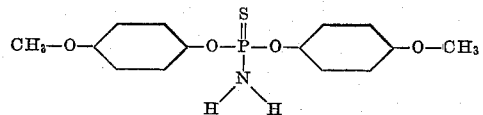

*Example 2.—O,O-di-(2-methoxyphenyl) amidothiophosphate*

In a similar fashion, 24.8 grams (0.2 mole) of 2-methoxyphenol dissolved in 50 milliliters of pyridine was added portionwise with agitation to 16.9 grams (0.1 mole) of thiophosphoryl chloride. The cooled intermediate product was then reacted with 50 milliliters of liquid ammonia as described in Example 1. Pyridine and unreacted ammonia were evaporated out of the mixture and the non-volatile residue filtered. The resulting semi-solid crude product was extracted with 200 milliliters of acetone and the extract evaporated to one eighth of its original volume. A crystalline precipitate separated from the residual acetone mixture. The acetone was decanted, and the precipitate recrystallized from 100 milliliters of methyl alcohol, and air dried. The resultant O,O-di-(2-methoxyphenyl) amidothiophosphate product was a white crystalline solid, substantially insoluble in water, melting at 135°–138° C., and having the formula

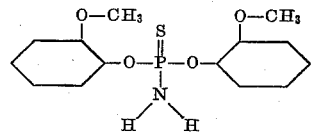

*Example 3.—O,O-di-(3-methoxyphenyl) amidothiophosphate*

In accordance with the method of the preceding examples, 3-methoxyphenol, thiophosphoryl chloride and ammonia may be reacted together in pyridine to obtain an O,O-di-(3-methoxyphenyl) amidothiophosphate product having the formula

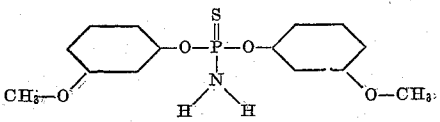

*Example 4*

In a representative parasiticidal operation, the products of Examples 1 and 2 were compounded in a finely milled white flour to produce compositions comprising 1 per cent by weight of the amidothiophosphate toxicants. The composition containing 1 per cent by weight of the O,O-di-(4-methoxyphenyl) amidothiophosphate product gave a kill of 90 per cent of milk weed bug in 7 days. The composition containing 1 per cent of the O,O-di-(2-methoxyphenyl) amidothiophosphate product gave 100 per cent kill of nymphs of American cockroach in 24 hours, and 84 per cent kill of confused flour beetle in seven days with an additional 16 per cent of the latter insects moribund.

I claim:
1. A O,O-di-(methoxyphenyl) amidothiophosphate having the formula

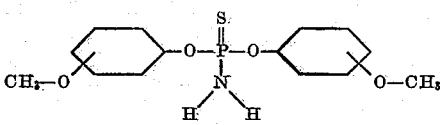

2. O,O-di-(4-methoxyphenyl) amidothiophosphate.
3. O,O-di-(2-methoxyphenyl) amidothiophosphate.

LEWIS R. DRAKE.

REFERENCES CITED

The following references are of record in the file of this patent:

UNITED STATES PATENTS

| Number | Name | Date |
|---|---|---|
| 2,146,584 | Lipkin | Feb. 7, 1939 |
| 2,172,241 | Dickey et al. | Sept. 5, 1939 |
| 2,194,724 | Rosenzweig | Mar. 16, 1940 |

FOREIGN PATENTS

| Number | Country | Date |
|---|---|---|
| 500,336 | Great Britain | Feb. 8, 1939 |

OTHER REFERENCES

Autenrieth et al.: "Ber. deutsch chem. Ges.," vol. 31 (1898), pp. 1094–1100.

"Chemical Abstracts," vol. 38 (1944), col. 14833, abstract of a publication by Breusch et al.